United States Patent [19]
Jade et al.

[11] Patent Number: 5,944,823
[45] Date of Patent: *Aug. 31, 1999

[54] OUTSIDE ACCESS TO COMPUTER RESOURCES THROUGH A FIREWALL

[75] Inventors: Prashanth Jade, Delray Beach; Victor Stuart Moore, Boynton Beach, both of Fla.; Arun Mohan Rao, Dallas, Tex.; Glen Robert Walters, Sebring, Fla.

[73] Assignee: International Business Machines Corporations, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,800

[22] Filed: Oct. 21, 1996

[51] Int. Cl.$^6$ .................................................. G06F 11/00
[52] U.S. Cl. .............................................. 713/201; 380/25
[58] Field of Search ........................... 395/187.01; 380/9, 380/25, 4; 713/201

[56] References Cited

U.S. PATENT DOCUMENTS

| | | | |
|---|---|---|---|
| 5,283,828 | 2/1994 | Saunders et al. | 380/4 |
| 5,416,842 | 5/1995 | Aziz | 380/30 |
| 5,455,953 | 10/1995 | Russell | 395/739 |

(List continued on next page.)

FOREIGN PATENT DOCUMENTS

WO 97 16911   5/1997   WIPO .............................. H04L 29/06

OTHER PUBLICATIONS

PCT International Preliminary Examination Report, Oct. 2, 1997, International Application No. PCT/GB97/02712.

Cheswick and Bellovin: "Firewalls and Internet Security, repelling the Willy Hacker"; Apr. 1994, Addison–Wesley Publishing Company; pp. 86 to 106.

Bryan J: "Firewalls for Sale"; Byte, vol. 20, No. 4, Apr. 1, 1995; pp. 99/100, 102, 104.

Ted Doty: "A firewall Overview"; Connexions, vol. 9, No. 7, Jul. 1995; pp. 20–23.

(List continued on next page.)

*Primary Examiner*—Alyssa H. Bowler
*Assistant Examiner*—Walter D. Davis, Jr.
*Attorney, Agent, or Firm*—Richard A. Tomlin; Robert Lieber

[57] ABSTRACT

A firewall isolates computer and network resources inside the firewall from networks, computers and computer applications outside the firewall. Typically, the inside resources could be privately owned databases and local area networks (LAN's), and outside objects could include individuals and computer applications operating through public communication networks such as the Internet. Usually, a firewall allows for an inside user or object to originate connection to an outside object or network, but does not allow for connections to be generated in the reverse direction; i.e. from outside in. The disclosed invention provides a special "tunneling" mechanism, operating on both sides of a firewall, for establishing such "outside in" connections when they are requested by certain "trusted" individuals or objects or applications outside the firewall. The intent here is to minimize the resources required for establishing "tunneled" connections (connections through the firewall that are effectively requested from outside), while also minimizing the security risk involved in permitting such connections to be made at all. The mechanism includes special tunneling applications, running on interface servers inside and outside the firewall, and a special table of "trusted sockets" created and maintained by the inside tunneling application. Entries in the trusted sockets table define objects inside the firewall consisting of special inside ports, a telecommunication protocol to be used at each port, and a host object associated with each port. Each entry is "trusted" in the sense that it is supposedly known only by individuals authorized to have "tunneling" access through the firewall from outside. These applications use the table to effect connections through the firewall in response to outside requests identifying valid table entries.

10 Claims, 2 Drawing Sheets

U.S. PATENT DOCUMENTS

| | | | |
|---|---|---|---|
| 5,481,715 | 1/1996 | Hamilton et al. | 395/700 |
| 5,602,918 | 2/1997 | Chen et al. | 380/21 |
| 5,606,617 | 2/1997 | Brands | 380/30 |
| 5,623,600 | 4/1997 | Ji et al. | 395/187.01 |
| 5,623,601 | 4/1997 | Vu | 395/187.01 |
| 5,632,011 | 5/1997 | Landfield et al. | 395/326 |
| 5,680,461 | 10/1997 | McManis | 380/25 |
| 5,692,047 | 11/1997 | McManis | 380/4 |
| 5,696,898 | 12/1997 | Baker et al. | 395/187.01 |
| 5,761,669 | 6/1998 | Montague et al. | 707/103 |

OTHER PUBLICATIONS

Bellovin S M et al: "Network Firewalls" IEEE Communications Magazine, vol. 32, No. 9, Sep. 1, 1994, pp. 50–57B.

Newman D et al: Can Firewalls Take the Heat?; Data Communications, vol. 24, No. 16, Nov. 21, 1995; pp. 71–78, 80.

Noritoshi Demizu et al; "DDT—A Versatile Tunneling Technology"; Computer Networks and ISDN Systems, vol. 27, No. 3, Dec. 1, 1994, pp. 493–502.

Symposium on Network and Distributed System Security, San Diego, Feb. 16–17, 1995, Proceedings, pp. 31–41.

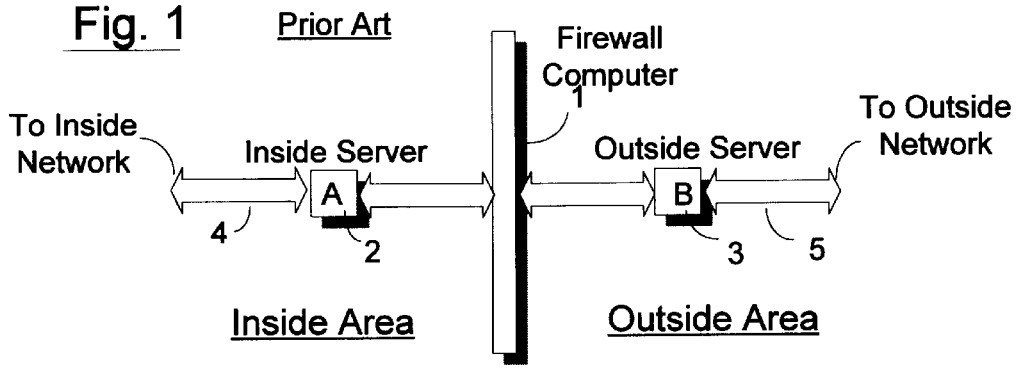
Fig. 1 Prior Art
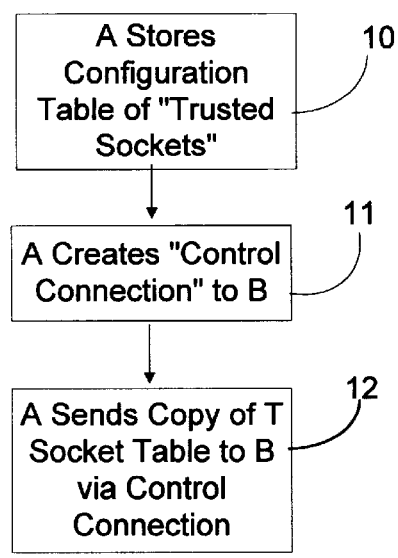
Fig. 2
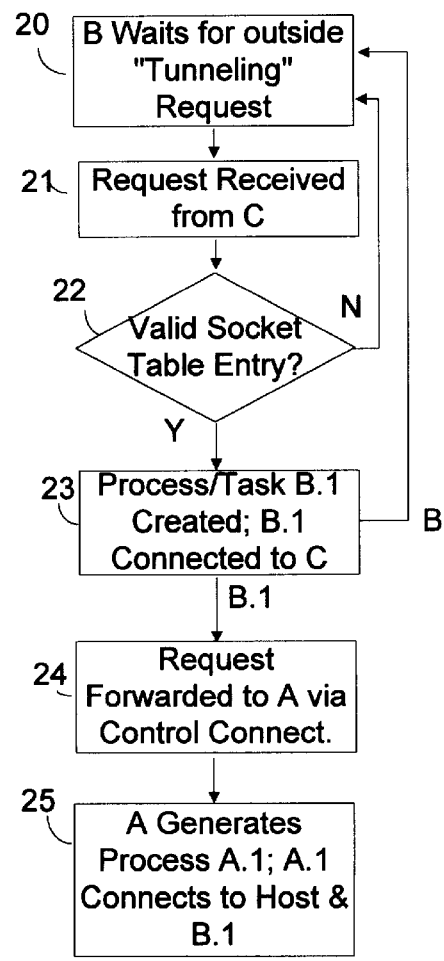
Fig. 3
Fig. 4

OUTSIDE ACCESS TO COMPUTER RESOURCES THROUGH A FIREWALL

FIELD OF THE INVENTION

This invention concerns provision of access to resources of a computer system or network, to objects outside a security firewall, in response to requests from respective objects.

BACKGROUND OF THE INVENTION

A firewall is a security system (hardware and/or software) that isolates resources of a computer system or network from objects outside of the system or network. Isolated resources are characterized as inside the firewall, and external equipment is considered outside the firewall. Typically, a firewall serves as a security enclosure around a private local area network (LAN) of computers and associated peripherals.

Generally, a firewall allows for inside objects to request and receive connections to outside objects (e.g. for inside applications to access outside internet nodes, etc.), but prevents outside objects from originating similar connections.

There are instances where it is desired to allow for objects outside a firewall to have access to inside resources, subject to restrictions that would not fully defeat the security purpose of the firewall. For example, it might be desirable to allow employees of a company owning resources inside the firewall to "telecommute" over public networks (such as the telephone network or that network and Internet points of access, etc.), from homes remote from their employer's place(s) of business (or from remote locations while on business trips or vacations). For that purpose then it would be desirable to permit such "trusted" individuals to be able to initiate access outside a firewall to resources inside the firewall (e.g. the employer's private databases, etc.).

To our knowledge, such access, in response to outside initiation or request, has been provided in the past by providing duplicate servers and database stores, both inside and outside the firewall, or by means of other arrangements that add considerable expense to maintenance of the firewall per se. Consider, for example, the costs of such outside duplication, or other process, in relation to massive and frequently updated databases stored inside the firewall. The present invention seeks to provide the desired outside access without unnecessary outside duplication of objects or resources inside the firewall.

SUMMARY OF THE INVENTION

In accordance with the invention, means are provided inside and outside a firewall for cooperatively producing tunneling effects, in response to certain types of requests initiated by objects outside the firewall, which effects result in creation of connections between such outside objects and resources inside the firewall. Connections so created have the unique property that they are effectively created from "inside out" as if they were requests originating from objects inside the firewall to destinations outside the firewall.

The "types of requests" accommodated by such "tunneling" means are requests addressed to what are presently termed "trusted sockets". Trusted sockets are entries in a table of trusted sockets that is created and maintained exclusively inside the firewall. Each entry in that table includes the address of a "trusted" port, a protocol (e.g. a telecommunication protocol such as TCP/IP, NNTP, etc.) pre-associated with that address, and the identity of a host object inside the firewall (e.g. a host computer or a host application). Thus, it is understood that in order for an individual and/or object outside the firewall to initiate such a request that individual must be entrusted with the information that represents a trusted socket entry that is currently valid.

The table of trusted sockets is created and maintained by a "tunneling application" running on an inside interface server (under control of appropriately authorized individuals having direct access to that server) that interfaces between this tunneling application and all other "accessible" objects/resources inside the firewall (including other applications running on the inside interface server). The inside interface server also establishes a "control connection" to an outside interface server which interfaces between the firewall and all objects outside the firewall. The control connection is accessible only to the tunneling application running on the inside interface server and a corresponding tunneling application running on the outside interface server; i.e. it is not directly accessible to any other applications running on these interfaces servers, and is totally inaccessible to both inside and outside objects not residing on these servers.

A copy of the trusted sockets table is transferred from the inside interface server to the outside interface server; e.g. when the table is created and/or altered, or at special times of day, etc.

When an outside object, that is currently not connected through the firewall, originates a request reaching the outside interface server, the tunneling application on that server determines if the request is directed to a trusted socket entry that is currently valid. If it is not so directed, the request is ignored. If the request is to a trusted socket, the request is passed over the control connection to the tunneling application on the inside interface server. Concurrently, a process (or task) associated with the request is generated in the outside interface server, and an outside connection is established between that process/task and the requesting object.

Upon receiving the request, the inside tunneling application also may be required to verify that the request is to a currently valid trusted socket and disallow the request if it is not. If the request is to a currently valid trusted socket, the inside tunneling application generates (or "spawns") an inside process associated with the request. Then the inside tunneling application: (a) generates connections between the inside resource associated with the port and host identity of the "requested" trusted socket entry and the inside interface server; and (b) communicating over the control connection with the outside tunneling application and a computer controlling the firewall itself, generates a connection through the firewall between the tasks generated/spawned on both the inside and outside interface servers. The connections generated/spawned by the inside and outside tunneling applications are separate from the control connection, and useful to carry data (usually in packet format defined by the trusted socket protocol) bidirectionally between the outside object that originated the request and the inside object targeted by the request.

These and other features, advantages, objectives and benefits of the present invention will be more fully understood by considering the following detailed description and claims.

BRIEF DESCRIPTION OF THE DRAWINGS

FIG. 1 is a schematic of a typical firewall environment in which the present invention can be applied.

FIG. 2 is a flow diagram illustrating the creation and handling of the trusted socket table mentioned above.

FIG. 3 is a flow diagram illustrating the firewall tunneling process of the present invention.

FIG. 4 illustrates a preferred form of the trusted sockets table mentioned above.

DETAILED DESCRIPTION

Figure 5:
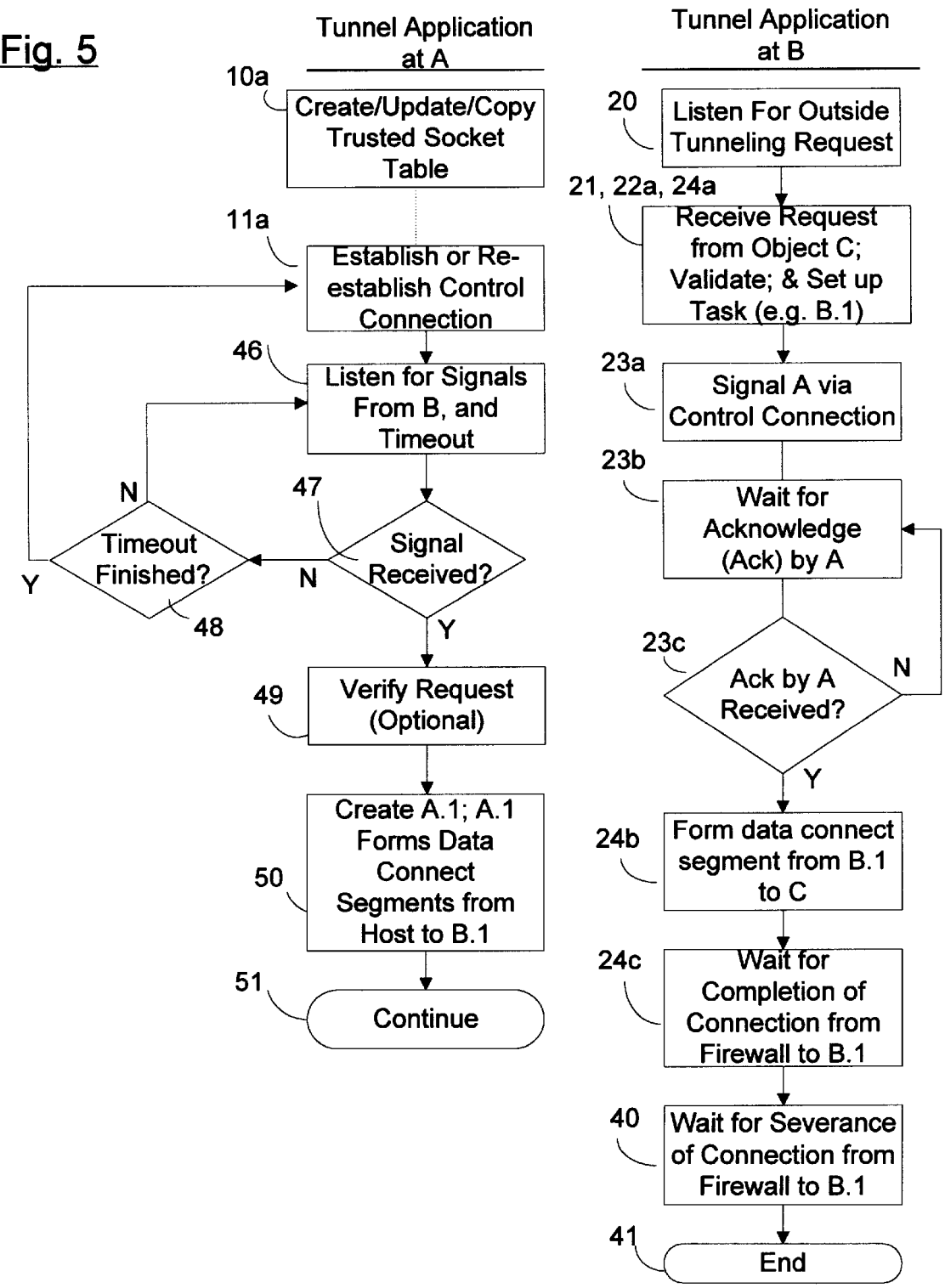
FIG. 5 is a flow diagram for explaining details of tunneling application operations inside and outside of a firewall, in accordance with the present invention.

FIG. 1 illustrates a typical firewall environment for application of the present invention. Firewall computer 1 maintains the firewall security function in accordance with presently commonplace procedures. The functions of this computer, other than those involving extending connections from objects inside the firewall to objects outside the firewall, are transparent to (and in essence not relevant to) the present invention. Interface servers 2 and 3 (labelled servers A and B respectively) operate respectively inside and outside the firewall created by 1. Server A interfaces between the firewall and objects (software applications, hardware entities, etc.) inside the firewall, including objects in Server A itself. Server B interfaces between the firewall and objects outside the firewall, including objects in server B itself.

In a typical firewall usage environment, server A connects to a network inside the firewall (e.g. a private local area network) via a connection shown at 4, and server B connects to a network outside the firewall (e.g. the Internet) via a connection shown at 5.

In applying the present invention to this environmental configuration, servers A and B are provided with "tunneling" software applications and store copies of a "trusted socket" table. These entities—the tunneling applications and the trusted socket table—are considered unique to the present invention and described herein.

FIGS. 2 and 3 describe (tunneling) processes performed at servers A and B in furtherance of the present invention.

As shown at 10, in FIG. 2, a trusted socket table (which is described below in reference to FIG. 4) is created in and stored at server A (or a store readily accessible to that server). As shown at 11, server A creates a special "control connection" to server B through the firewall (computer), and passes a copy of the trusted sockets table to server B over the control connection. This control connection, also considered part of the present invention, is used by the above-mentioned tunneling applications to effectively inter-communicate, and thereby form other connections (hereinafter termed "data connections") between objects inside and outside the firewall, in response to requests received from outside objects.

Segments of these data connections extending through the firewall are entirely separate from the control connection used in their formation, and are always formed under control of processes running inside the firewall. For an outside request to give rise to formation of a data connection to an inside object, the request must be directed to an entry in the trusted sockets table, and validated as such. Outside requests found to be invalid are ignored, so that the firewall and its inside resources are effectively invisible to and inaccessible to outside requesters having invalid request information. Conversely, it should be understood that valid requests are issuable only at the direction of individuals having privileged knowledge of currently valid entries in the trusted sockets table (e.g. telecommuting employees of the owner of the inside resources, etc.).

FIG. 3 describes tunneling functions performed at servers A and B, after B has received and stored its copy of the trusted sockets table sent by A.

As shown at 20, (the tunneling application in) server B waits to receive an outside request that effectively calls for a tunneling operation; i.e. creation of a data connection between an inside "host" object designated in the request and the outside object from which the request was sent. Upon receiving a request (21, FIG. 3), (the tunneling application at) B checks to verify that the request is a valid one (decision 22, FIG. 3). In respect to the last-mentioned function, it should be understood that server B only receives requests directed to that server, and that the tunneling application on server B only receives requests that appear to be directed to a port inside the firewall, and distinguishes those requests as valid only if they are directed to a currently valid entry in the trusted sockets table mentioned earlier.

If the request is invalid it is ignored, and (the application at) server B resumes waiting for a request. However, if the request is valid, (the tunneling application at) server B creates a process or task "B.1" for handling outside elements of data transfer relative to the requesting object (23, FIG. 3). Task B.1 establishes a data connection between itself and the requesting object (also 23, FIG. 3), and forwards the request to (the tunneling application at) server A, via the control connection, along with the identity of task B.1 (24, FIG. 3).

Upon receiving a validated request, (the tunneling application at) server A generates a process or task A.1, for handling inside aspects of the transmission of data between the outside requesting object and a host object identified in the request (25, FIG. 3; the latter object being a component of a trusted socket designation as explained below). Task A.1 creates data connection segments from the host object to the firewall computer (also 25, FIG. 3), and instructs the firewall computer to form a connection to B.1 (also 25, FIG. 1); thus completing a data connection between the inside host object and the outside requesting object. It should be appreciated that this data connection may require buffers, in servers A and B and the firewall computer, of a size determined by the protocol of data transmission (discussed further below), and the required speed of (packet) transfer for that protocol.

The form of the trusted sockets table is illustrated in FIG. 4. Examples of 2 specific entries are shown at 30, and additional entries are implied at 31 by dotted lines extending downward from the second entry. Each entry consists of a port number, information defining a transmission protocol (usually, a burst packet transfer protocol), and information identifying a host object. The port number is an address inside the firewall assigned to the host object. As examples of protocols, the first two entries in the table list NNTP (Network News Transport Protocol) and HTTP (HyperText Transport Protocol).

FIG. 5 shows in finer detail operations performed by the tunneling applications at interface servers A and B. Operations that are the same as operations shown in FIGS. 2 and 3 are identified by identical numerals. Operations that are parts of, or differ in some respect from, operations shown in FIGS. 2 and 3 are identified by the same numbers followed by letters (a, b, etc.). Other operations are identified by numbers different from those previously used.

Operation 10a at server A, a composite of operations 10 and 12 of FIG. 2, is the creation and updating (expansion, modification. etc.) of the trusted sockets table and the copying of the latter to server B. Operation 11a at server A is the establishment or (as explained below) re-establishment of the control connection between (the tunneling applications at) servers A and B. A need to re-establish the control connection arises when the connection is unintentionally broken, and the operations required to detect and respond to such occurrences are shown at 46–48 in FIG. 5 (which are discussed further below).

After receiving its copy of the trusted sockets table, (the tunneling application at) server B listens for outside requests (20, FIG. 5). When a valid outside tunneling request is received, and an associated data handling task (e.g. B.1, FIG. 3) has been created therefor (21–22a, 24a, FIG. 5), server B presents the request to server A (23a, FIG. 5), along with control signals indicating the action occurring and information identifying the task (e.g. B.1) created at B to attend to the request. Server B then waits for acknowledgement of receipt of the request from server A (23c, FIG. 5), and upon receiving such server B establishes a data connection segment from the newly created task to the requesting object (24b, FIG. 5; e.g. from B.1 to C as in FIG. 3). Server B then waits for establishment of a data connection segment from the firewall is to the task just created at B (24c, FIG. 5), that occurrence implying establishment of an associated data connection segment between the host object (the one identified in the request) and server B. The tunneling process at server B is then complete until the data connection segment between the firewall and the task at B is terminated (40, FIG. 5), ending the involvement of server B in that connection and the associated request (41, FIG. 5).

Returning to consideration of tunneling actions at server A, after establishing or re-establishing the control connection, server A listens for (request forwarding) signals from B (46, FIG. 5). If a signal hasn't been received (47, FIG. 5), but a predetermined timeout interval has not elapsed since the waiting started (48, FIG. 5), server A merely continues to wait for such signal. However, if the timeout has lapsed (Yes decision at 48, FIG. 5) it is assumed that the control connection has been (unintentionally) broken, and the connection is re-established (11a repeated).

If a request is received from server B, server A may optionally perform its own validation operation (49, FIG. 5) to verify that the request is to a currently valid trusted socket. If that option is used and the request is found to be invalid, an error signal would be returned to server B instead of the acknowledgement awaited at 23b. If the option is not used, or if it is used and the request is found to be valid, server A proceeds to establish its internal task such as A.1, and the latter, as described previously, forms data connection segments from the host object to the firewall, and directs the firewall computer to extend the data connection to B.1 (50, FIG. 5). This concludes server A's involvement in the current request, freeing it to continue with other requests (51, FIG. 5).

Program Products

The foregoing tunneling applications can be delivered as a "computer readable" program product; e.g. on storage media or through communication networks. It should be understood that such product can be provided as either a single integral entity (e.g. one installed on inside server A and transferred in whole or part to outside server B), or two entities (or parts) separately installable on inside and outside servers. It also should be understood that the firewall computer is a necessary participant in the creation of data connections through the firewall.

Accordingly, we claim:

1. Tunneling apparatus for a data communication network containing a firewall, said firewall defining inside and outside regions and forming a security barrier preventing objects in said outside region from directly initiating access to objects in said inside region, while permitting objects in said inside region to directly initiate and obtain access to objects in said outside region; said tunneling apparatus enabling objects in said outside region to obtain access to predetermined trusted objects in said inside region in a manner requiring formation of connections under exclusive control of processes operating in said inside region, said tunneling apparatus comprising:

an outside interface computer in said outside region, said outside interface computer interfacing between said firewall and objects in said outside region;

an inside interface computer in said inside region, said inside interface computer interfacing between said firewall and objects in said inside region;

said inside interface computer having a special control connection to said outside interface computer, through said firewall, for transferring control information to said outside computer;

said inside interface computer maintaining a table of trusted objects and intermittently providing copies of said table to said outside interface computer through said control connection; entries in said table serving as a basis for permitting and denying access to access to trusted objects in said inside region when requests for such access are initiated by objects in said outside region;

said outside interface computer acting to selectively transfer requests sent from objects in said outside region to said inside computer, via said control connection, when said requests are directed to trusted objects identified by entries in said table; and said inside computer acting in response to a said transferred request to establish a data communication connection unique to the respective request, and separate from said control connection, for communicating data associated with the respective trusted object between said inside and outside regions.

2. Tunneling apparatus in accordance with claim 1 wherein:

said table entries individually comprise information uniquely identifying a respective trusted object and a data communication port of said inside interface computer to be used for transferring said data associated with said respective trusted object between said inside and outside regions; said data communication port comprising a part of said data communication connection.

3. Tunneling apparatus in accordance with claim 2 wherein:

said information comprising individual said table entries includes a selected data communication protocol to be used for communicating with said data communication port.

4. Tunneling apparatus in accordance with claim 1 wherein said inside and outside interface computers have:

tunneling application programs enabling said computers to establish and utilize said unique data communication connection.

5. Tunneling apparatus in accordance with claim 1 wherein:

said inside and outside regions respectively contain inside and outside data communication networks, each network susceptible of having plural communication nodes, and said inside and outside interface computers are respectively adapted to act as servers between said firewall and individual said communication nodes of said inside and outside networks.

6. Tunneling apparatus for a data communication network containing a firewall, said firewall defining inside and outside regions and forming a security barrier preventing objects in said outside region from directly initiating access to objects in said inside region, while permitting objects in said inside region to directly initiate and obtain access to objects in said outside region; said tunneling apparatus enabling objects in said outside region to obtain access to predetermined trusted objects in said inside region in a manner requiring formation of connections under exclusive control of processes operating inside said region, said tunneling apparatus comprising:

an outside interface computer in said outside region, said outside interface computer interfacing between said firewall and objects in said outside region;

an inside interface computer in said inside region, said inside interface computer interfacing between said firewall and objects in said inside region;

means in both said inside and outside interface computers for ascertaining identities of said predetermined trusted objects;

means in said outside interface computer, responsive to a request sent from an object in said outside region, for cooperating with said ascertaining means to determine if that request is directed to one of said trusted objects and, if the request is so directed, for routing the request to said inside interface computer; and means in both said inside and outside interface computers responsive to said request directed to said one of said trusted object for forming a data communication connection between said one of said trusted objects and the outside object that sent the respective request; wherein segments of said data communication connection located in said inside region and extending through said firewall are formed under exclusive control of said inside interface computer, and a segment of said data communication connection extending from said outside interface computer to the object that sent the request is formed under control of said outside interface computer; and further wherein:

said means for ascertaining identities of said trusted objects includes: means in said inside interface computer for creating and maintaining a table listing said trusted objects; means for transferring a copy of said table listing through said firewall to said outside interface computer; and means in said outside interface computer for storing and referring to said copied table listing; and each entry in said table of trusted objects consists of a first item of information identifying an object in said inside region, a second item of information identifying a data communication port assigned to the respective object, and a third item of information identifying a data communication protocol to be used for transmitting data through said port.

7. Computer-readable tunneling software for enabling data handling objects outside a firewall to establish data communication connections with data handling objects inside said firewall, said software comprising:

inside and outside program segments intended to run on computers located respectively inside and outside said firewall, said computers interfacing between said firewall and said objects respectively inside and outside said firewall;

said inside segment comprising: means for operating a said inside computer to create and maintain a table of trusted inside objects; and means for operating said inside computer in conjunction with said firewall to provide a copy of said table to said outside segment; and wherein each entry in said table of trusted objects consists of a first item of information identifying a specific object inside said firewall, a second item of information identifying a port of said inside computer allocated for said specific object, and a third item of information identifying a data communication protocol required for conducting data communication with said specific object and port.

8. Tunneling software in accordance with claim 7 wherein each said program segment comprises means for respectively operating said inside and outside computers to establish data connection segments between a said specific object identified in a request sent from an object outside said firewall to said outside computer, when said specific object corresponds to a said entry in said table of trusted objects, and means to establish tasks respectively in said inside and outside computer for conducting data communications between said outside object which sent said request and said specific object identified in said request; and wherein said data connection segments extending from said specific object through said firewall to said outside computer are constructed under exclusive control of the task established in said inside computer.

9. A method for enabling objects outside a computer system security firewall to obtain data connections to selected objects inside said firewall comprising:

creating and maintaining a table of selected objects inside said firewall, each entry in said table comprising items of information identifying a selected object, a data communication port assigned to said object and a data communication protocol assigned to the respective port;

providing a copy of said table outside said firewall;

providing outside objects with a specific security clearance access to items of information constituting an entry in said table;

having respective said outside objects issue requests for access to the object, port and protocol entity defined by the items of information provided to said outside objects; and having computer systems outside and inside said firewall establish a data transmission connection between a specific inside object identified in each request and an outside object originating that request; wherein segments of said data transmission connection that lie inside said firewall and extend through said firewall are constructed under exclusive control of said computer system inside said firewall.

10. The method defined in claim 9 including:

establishing a private control connection between said inside and outside computers; and using said control connection exclusively for transmitting requests containing items of information corresponding to entries in said table from said outside computer to said inside computer; and to sustain communications between said computers as required to establish said data connections through said firewall.

* * * * *